United States Patent
Matsuda et al.

(10) Patent No.: US 11,247,652 B2
(45) Date of Patent: Feb. 15, 2022

(54) NON-EXCITATION OPERABLE ELECTROMAGNETIC BRAKE

(71) Applicant: Kubota Corporation, Osaka (JP)

(72) Inventors: Kazuaki Matsuda, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/434,369

(22) Filed: Jun. 7, 2019

(65) Prior Publication Data

US 2020/0122704 A1    Apr. 23, 2020

(30) Foreign Application Priority Data

Oct. 23, 2018   (JP) ............................. JP2018-199329

(51) Int. Cl.
| | |
|---|---|
| *B60T 13/58* | (2006.01) |
| *B60T 13/74* | (2006.01) |
| *B60T 7/08* | (2006.01) |
| *F16H 3/72* | (2006.01) |
| *F16H 25/24* | (2006.01) |

(52) U.S. Cl.
CPC ................ *B60T 13/58* (2013.01); *B60T 7/08* (2013.01); *B60T 13/748* (2013.01); *F16H 3/721* (2013.01); *F16H 25/2454* (2013.01)

(58) Field of Classification Search
CPC .......... B60T 13/58; B60T 13/748; B60T 7/08; F16D 65/18; F16D 59/02; F16H 25/2454
See application file for complete search history.

(56) References Cited

U.S. PATENT DOCUMENTS

| | | | | |
|---|---|---|---|---|
| 2,512,565 | A * | 6/1950 | Hallander | F16D 59/02 188/171 |
| 2,620,901 | A * | 12/1952 | Stearns | F16D 65/46 188/171 |
| 2,974,756 | A * | 3/1961 | Eldrong | H02K 7/1025 188/171 |
| 4,820,946 | A | 4/1989 | Gutbrod | |
| 7,100,747 | B1 * | 9/2006 | Conrad | H02K 7/1025 188/162 |
| 2008/0202872 | A1 * | 8/2008 | Huang | B60T 7/085 188/171 |

FOREIGN PATENT DOCUMENTS

| | | |
|---|---|---|
| JP | 10318293 A | 12/1998 |
| JP | 2001165208 A | 6/2001 |
| JP | 2002054664 A | 2/2002 |
| JP | 2010116935 A | 5/2010 |

* cited by examiner

*Primary Examiner* — Robert A. Siconolfi
*Assistant Examiner* — James K Hsiao
(74) *Attorney, Agent, or Firm* — The Webb Law Firm (57) ABSTRACT

Provided is a non-excitation operable electromagnetic brake that includes a manually operable rotary cam for switching over a rotor to a brake releasing state, but that allows easy recognition of switchover to the brake released state via an operation reaction force and that also allows reliable keeping of the rotary cam under its acting state. Even when an electromagnet is under a non-excited state, when a rotary cam is rotatably operated to an acting position, an acting portion of the rotary cam slidably operates a rotor via a releasing plate to a brake releasing state against springs. The acting portion of the rotary cam is formed linear along a tangent at a center of the acting portion with respect to a rotary cam rotational direction.

5 Claims, 4 Drawing Sheets

NON-EXCITATION OPERABLE ELECTROMAGNETIC BRAKE

CROSS-REFERENCE TO RELATED APPLICATION

This application claims priority to Japanese Patent Application No. 2018-199329 filed Oct. 23, 2018, the disclosure of which is hereby incorporated by reference in its entirety.

TECHNICAL FIELD

This invention relates to a non-excitation operable electromagnetic brake.

BACKGROUND ART

Known non-excitation operable electromagnetic brakes include, e.g. as disclosed in Patent Document 1, one configured such that a manually operable rotary cam is provided for operating a rotor into a brake releasing state under a non-excited state of an electromagnet, thus allowing a brake releasing by a manual operation even when the electromagnetic is under non-exited state.

Background Art Document

[Patent Document 1] Japanese Unexamined Patent Application Publication No. 2002-54664

SUMMARY OF THE INVENTION

Problem to be Solved by Invention

In case a rotary cam is configured to press a rotor into a brake releasing state via a circumferential cam having a circumferential shape, when the rotor is switched from a braking state to the brake releasing state, a change occurring in the operation reaction force applied to the rotary cam takes place in a gradual manner. This makes it difficult to judge, via the operational reaction force, whether the brake has been released or not. Also, when the rotary cam is set to its acting position to keep the brake released, if an external force due to e.g. vibration is applied thereto, the rotary cam can easily slip off the acting position.

The present invention provides a non-excitation operable electromagnetic brake that includes a manually operable rotary cam for switching over a brake to a released state, but that allows easy recognition of switchover to the brake released state via an operation reaction force and that also allows reliable keeping of the rotary cam under its acting state.

Solutions

A non-excitation operable electromagnetic brake according to the present invention comprises:
a spring for operating a rotor into a braking state;
an electromagnetic configured, under an excited state thereof, to operate the rotor into a brake releasing state against the spring; and
a rotary cam manually and rotationally operable between an acting position for slidably operating the rotor into the brake releasing state against the spring under the non-excited state of the electromagnet and a releasing position for releasing a slidable operation of the rotor, thus allowing an operation of the rotor into the brake releasing state by the electromagnet;
wherein in a circumferential cam of the rotary cam, an acting portion thereof corresponding to the acting position is formed linear along a tangent at a center of the acting portion with respect to a rotary cam rotational direction.

With the above-described arrangement, the rotor is switched from the braking state to the brake releasing state, by an action provided by the linear acting portion in the circumferential cam of the rotary cam. Thus, as compared with an arrangement that switchover of the rotor from the braking state to the brake releasing state is provided by an action of an arcuate acting portion of the circumferential cam, the switchover of the rotor from the braking state to the brake releasing state provides larger/sharper (i.e. more distinct) change in the operation reaction force applied to the rotary cam, thus making it easy to recognize (or feel) whether the brake has been released or not, via the operation reaction force.

Further, when the acting portion of the circumferential cam of the rotary cam comes into contact with an action target, this contact takes place in the form of a line contact due to the linear shape of the acting portion. Therefore, even if an external force such as vibration is applied, slipping displacement of the rotary cam off the acting position will hardly occur, so that the brake which has been set to the brake releasing state can be maintained in a reliable manner at this position without being easily and inadvertently switched over to the braking state due to vibration, etc.

In the present invention, preferably, there is provided a rotation restriction portion configured to restrict rotation of the rotary cam from the releasing position in a rotational direction opposite to a set rotational direction which is set for switching the rotary cam from the releasing position to the acting position.

With the above-described arrangement, the rotary cam can be rotated only in the set rotational direction. So, the arrangement requires only a space just enough to allow only the rotation of the rotary cam in the set rotational direction, thus the arrangement can be formed compact.

In the present invention, preferably, the rotation restriction portion is configured to come into contact with the rotary cam.

With the above-described arrangement, the rotation restriction portion can be provided in a compact manner within a brake case.

In the present invention, preferably, there is provided a positioning mechanism capable of switchover between a positioning state for fixedly positioning an operational tool for rotating the rotary cam to operational positions corresponding respectively to the releasing position and the acting position and a position releasing state for allowing an operation of the operational tool.

With the above-described arrangement, by positioning of the operational tool by the positioning mechanism, the rotary cam can be maintained in a reliable manner at the acting position and the releasing position, respectively. Thus, even in the event of application of a strong external force due to e.g. traveling vibration, the rotary cam can be maintained in a reliable manner at the acting position or the releasing position, without being displaced therefrom.

In the present invention, preferably:
the positioning mechanism includes an engaging portion protruding from the operational tool and a positioning portion provided at a portion opposed to the engaging portion;

the positioning portion includes a first receded portion for positioning the operational tool at the acting position and a second receded portion for positioning the operational tool at the releasing position; and positioning of the operational tool is provided by engagement of the engaging portion in the first receded portion or the second receded portion.

In the present invention, preferably, the positioning mechanism further includes an urging portion for urging to maintain the positioned state, switchover from the positioning state to the position releasing state being made against an urging force of the urging portion.

MODE OF EMBODYING THE INVENTION

Next, an embodiment as an example of the present invention will be explained.

Figure 1:
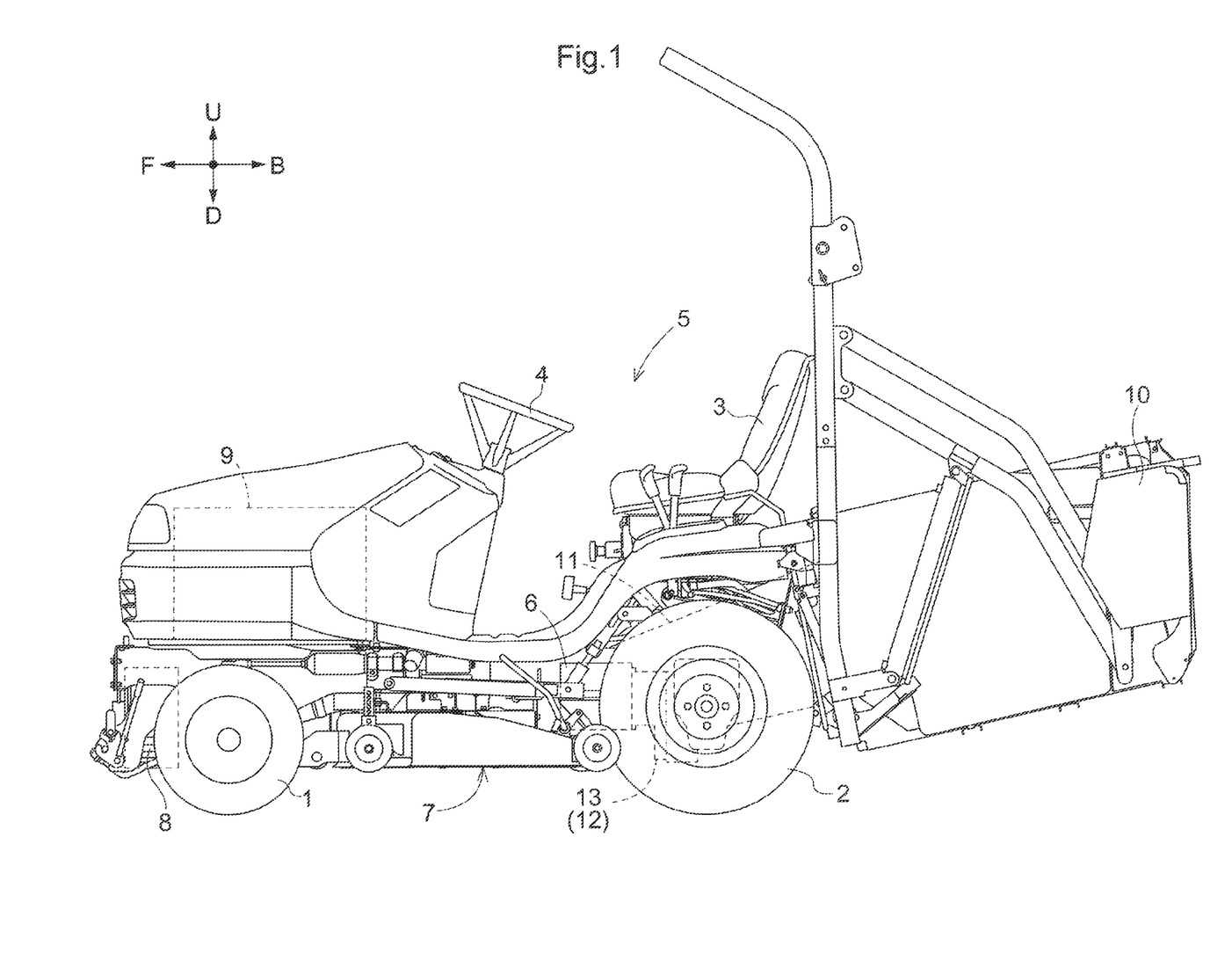
FIG. 1 is a left side view showing a riding lawnmower in its entirety.

Incidentally, in this detailed description, with respect to a vehicle body of a riding lawnmower, a direction of an arrow F shown in FIG. 1 represents the "vehicle body front side", a direction of an arrow B represents the "vehicle body rear side", a direction of an arrow U represents the "vehicle body upper side" and a direction of an arrow D represents the "vehicle body lower side", the direction of the near side in the illustration represents the "vehicle body left side" and the direction on the far (back) side in the illustration represents the "vehicle body right side", respectively.

[General Description of Riding Type Lawnmower]

As shown in FIG. 1, a riding type lawnmower includes a riding type vehicle body mounting a pair of left and right front wheels 1 that are pivotally steerable and a pair of left and right rear wheels 2 that can be driven, and forming a driving section 5 having a driver's seat 3, and a steering wheel 4 for steering the front wheels 1. Beneath the driver's seat 3, there is provided a traveling electric motor 6 for driving the left and right rear wheels 2. Between the front wheels 1 and the rear wheels 2, a mowing device 7 is provided for mowing grass and lawn. At a portion of the vehicle body on front side of the mowing device 7, a utility (implement) electric motor 8 is provided for driving the mowing device 7. At a front portion of the vehicle body, there is provided a battery 9 for feeding electric power to the traveling electric motor 6 and the utility electric motor 8. To a rear portion of the vehicle body, there is coupled a grass collecting container 10 for collecting and storing grass or lawn clippings obtained by the mowing device 7. Between the mowing device 7 and the grass collecting container 10, a conveying duct 11 is provided for conveying the grass or lawn clippings obtained by the mowing device 7 to the grass collecting container 10. The conveying duct 11 is disposed to extend through between the left rear wheel 2 and the right rear wheel 2 beneath the vehicle body.

[Arrangement of Non-Excitation Operable Electromagnetic Brake]

Figure 2:
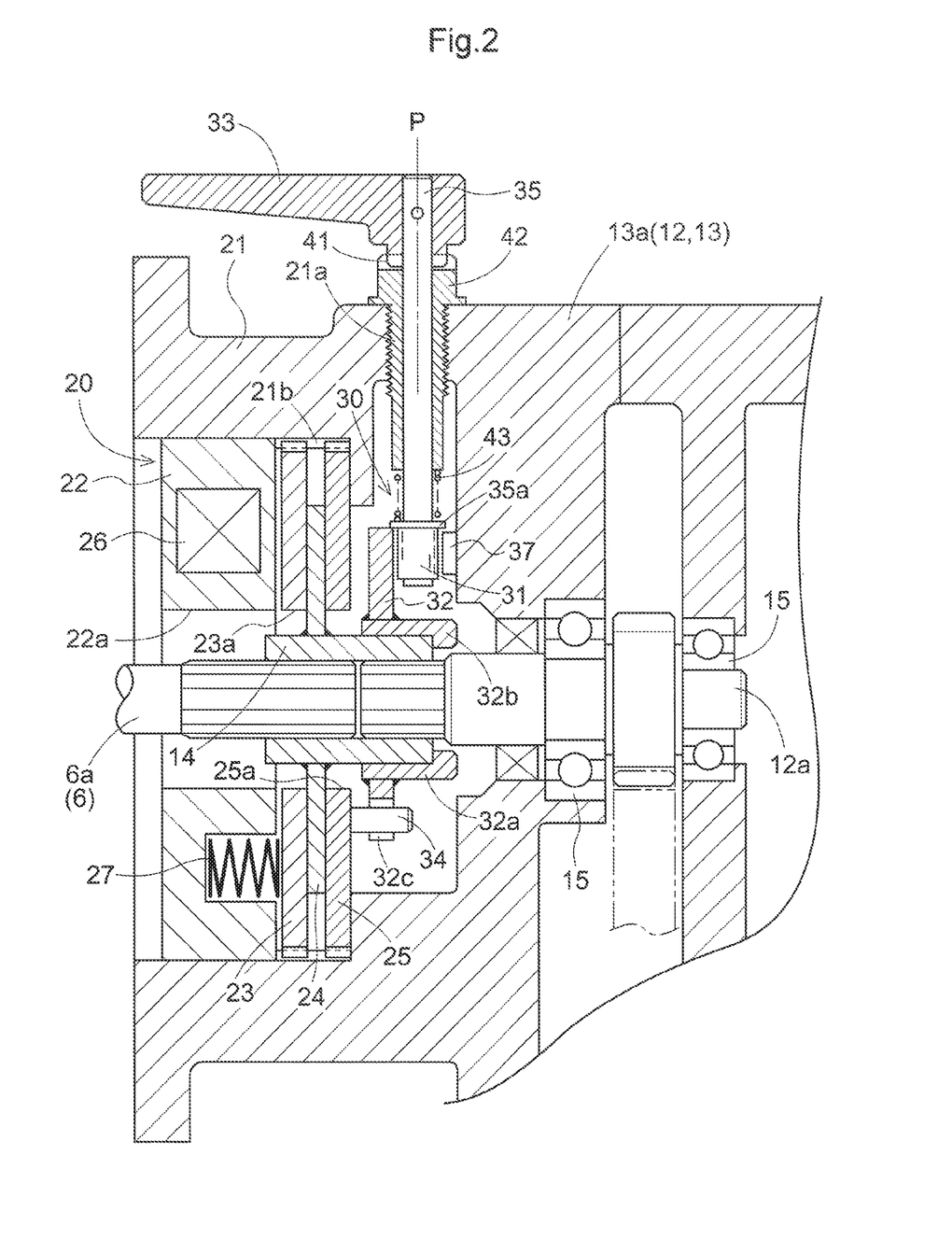
FIG. 2 is a section view of a non-excitation operable electromagnetic brake.

As shown in FIG. 1, rearwardly of the traveling electric motor 6 (to be referred to simply as "traveling motor 6" hereinafter), there is provided a traveling transmission 12 for speed-changing power of the traveling motor 6 and then the resultant speed-changed power to the left and right rear wheels 2. As shown in FIG. 2, on the front side of a transmission case 13 which accommodates the traveling transmission 12, there is provided a non-excitation operable electromagnetic brake 20 (to be referred to simply as "electromagnetic brake 20" hereinafter) configured to apply braking to the traveling motor 6 (see FIG. 1) and braking to the rear wheels 2 via the traveling transmission 12.

As shown in FIG. 2, an output shaft 6a of the traveling motor 6 and an input shaft 12a of the traveling transmission 12 are disposed coaxially side by side in the front/rear direction and operably coupled to each other via a coupling member 14. The input shaft 12a is rotatably supported via a bearing 15 to an input gear case 13a provided at a front portion of the transmission case 13. A front portion of the coupling member 14 is engaged to a splined portion of the output shaft 6a and a rear portion of the coupling member 14 is engaged to a splined portion of the input shaft 12a. The coupling member 14 is non-rotatably coupled with the output shaft 6a and the input shaft 12a respectively and also slidably coupled with the output shaft 6a and the input shaft 12a respectively.

The electromagnetic brake 20, as shown in FIG. 2, includes a brake case 21 connected to a front portion of an input gear case 13a. The brake case 21 is formed integral with the input gear case 13a. Inside the brake case 21, there are provided an electromagnet 22, an armature 23, a rotor 24 and a stator member 25.

The electromagnet 22 having a through hole 22a through which the output shaft 6a is inserted is fixed to the brake case 21. At a plurality of portions around the through hole 22a of the electromagnet 22, coils 26 are provided. At a plurality of portions around the through hole 22a of the electromagnet 22, springs 27 are also provided.

The armature 23 having a through hole 23a through which the coupling member 14 is inserted, is disposed between the electromagnet 22 and the rotor 24. The armature 23 is supported to a support portion 21b of the brake case 21, with the armature 23 being slidable along an axial direction of the output shaft 6a.

The rotor 24, as being non-rotatably coupled with the coupling member 14, is disposed between the armature 23 and the stator member 25. The rotor 24 and the coupling member 14 are coupled to each other via welding. The rotor 24 is supported via the coupling member 14 to the output shaft 6a and the input shaft 12a, respectively. The rotor 24 is rotatable together with the output shaft 6a and the input shaft 12a, respectively and also is slidable together with the coupling member 14 relative to the output shaft 6a and the input shaft 12a, respectively.

The stator member 25, having a through hole 25a through which the coupling member 14 is inserted, is provided on the side opposite to the side of the armature 23 relative to the rotor 24. The stator member 25 is non-rotatably supported to the support portion 21b of the brake case 21.

In operation, the electromagnetic brake 20 is rendered into a braking state (engaged stage) for applying a braking force to the traveling motor 6 and the traveling transmission 12, in response to an operation of the electromagnet 22 to a non-excited state.

Figure 3:
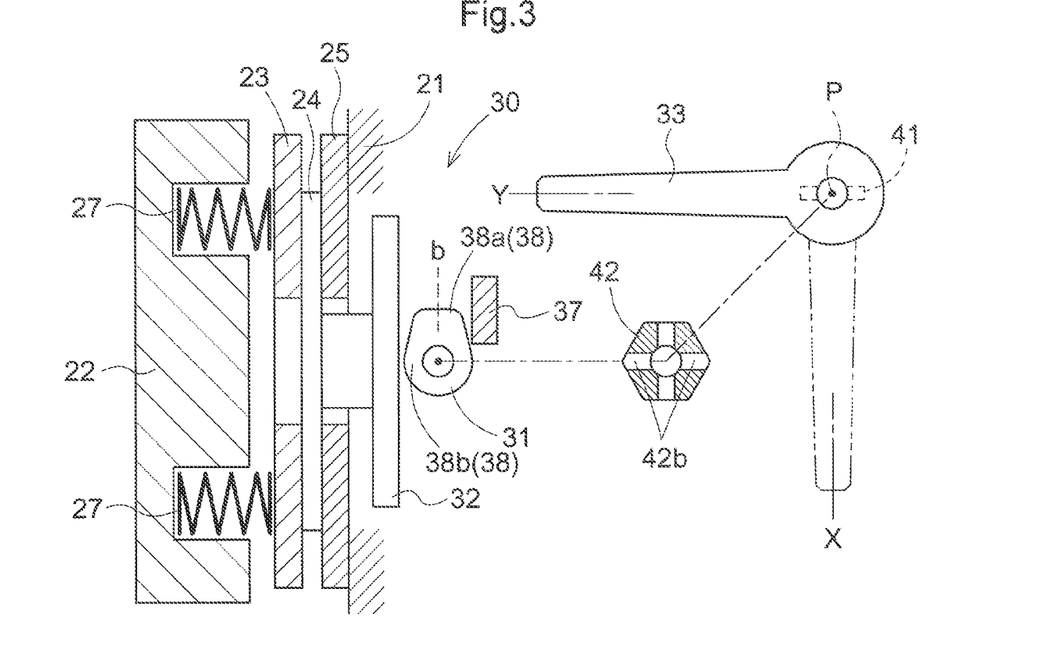
FIG. 3 is an explanatory view showing an operational position of a rotary cam and an operational tool.

More particularly, when the electromagnet 22 is operated into the non-excited state, as shown in FIG. 3, the armature 23 will be slidably operated toward the stator member 25 by the respective springs 27, whereby the rotor 24 is pressed against the lateral portion of the stator member 25 by the armature 23, thus applying a braking force to the rotor 24 from the stator member 25. Namely, the rotor 24 is operated into the braking state by the respective springs 27 and the rotor 24 applies braking forces to the output shaft 6a and the input shaft 12a.

In the electromagnetic brake 20, when this electromagnet 22 is operated to the excited state, the brake 20 is rendered into the brake releasing state (disengaged state) for releasing application of the braking forces to the traveling motor 6 and to the traveling transmission 12.

Figure 4:
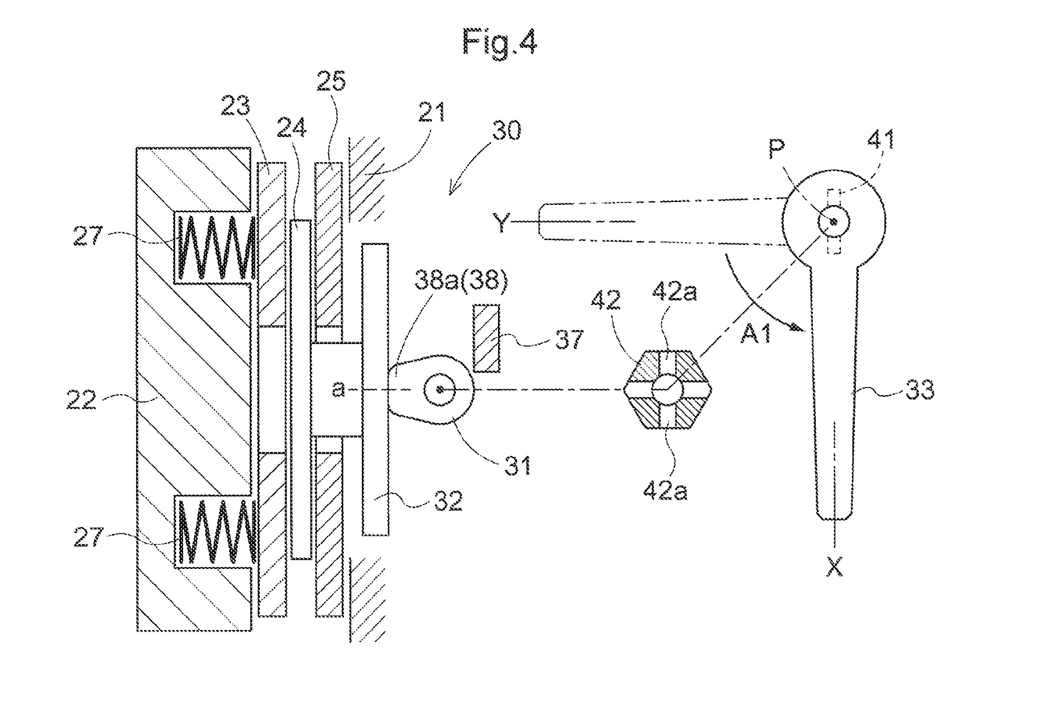
FIG. 4 is an explanatory view showing an operational position of the rotary cam and the operational tool.

More particularly, in response to an operation of the electromagnet 22 to the excited state, as shown in FIG. 4, the armature 23 is drawn toward this electromagnet 22 against urging forces of the respective springs 27, thus releasing pressing of the rotor 24 to the stator member 25, whereby application of the braking force by the stator member 25 to the rotor 24 is released. Namely, the rotor 24 will be operated by the electromagnet 22 to the brake releasing state against the respective springs 27, whereby application of the braking forces by the rotor 24 to the output shaft 6a and the input shaft 12a will be released.

[Arrangement of Releasing Mechanism]

As shown in FIG. 2, the electromagnetic brake 20 is provided with a releasing mechanism 30 having a rotary cam 31 mounted within the brake case 21. The electromagnetic brake 20 under its braking state can be switched over to a brake releasing state by the releasing mechanism 30.

The releasing mechanism 30, as shown in FIG. 2, includes the rotary cam 31 and a releasing plate 32 which are provided within the brake case 21 and includes also an operational tool 33 which is provided outside the brake case 21.

As shown in FIG. 2, the releasing plate 32 is disposed on the side opposite to the side of the rotor 24, relative to the stator member 25. A boss portion 32a provided at the base of the releasing plate 32 is rotatably engaged on the coupling member 14. The releasing plate 32 is supported to the coupling member 14 via the boss portion 32a. At one terminal end portion of the boss portion 32a, there is formed a pressing operational portion 32b engageable with the end portion of the coupling member 14 opposite to the side of the electromagnet for pressing the coupling member 14. From the boss portion 32a, a rotation stopping portion 32c protrudes in a protruding direction opposite to the protruding direction of the releasing plate 32. This rotation stopping portion 32c is retained to a stopper member 34. In operation, when the boss portion 32a tends to rotate relative to the coupling member 14, the rotation stopping portion 32c will be received and stopped by the stopper member 34, thus preventing rotation of the boss portion 32a relative to the coupling member 14. Further, when the releasing plate 32 is pressed toward the stator member 25, the rotation stopping portion 32c will slide relative to the stopper member 34, thus allowing the boss portion 32a to be moved together with the releasing plate 32.

When the releasing plate 32 is pressed toward the stator member 25, the releasing plate 32 will press the coupling member 14 with the pressing operational portion 32b and will slide relative to the output shaft 6a and the input shaft 12a simultaneously, thus allowing sliding operations by the coupling member 14 of the rotor 24 and the armature 23 toward the electromagnet 22.

Figure 5:
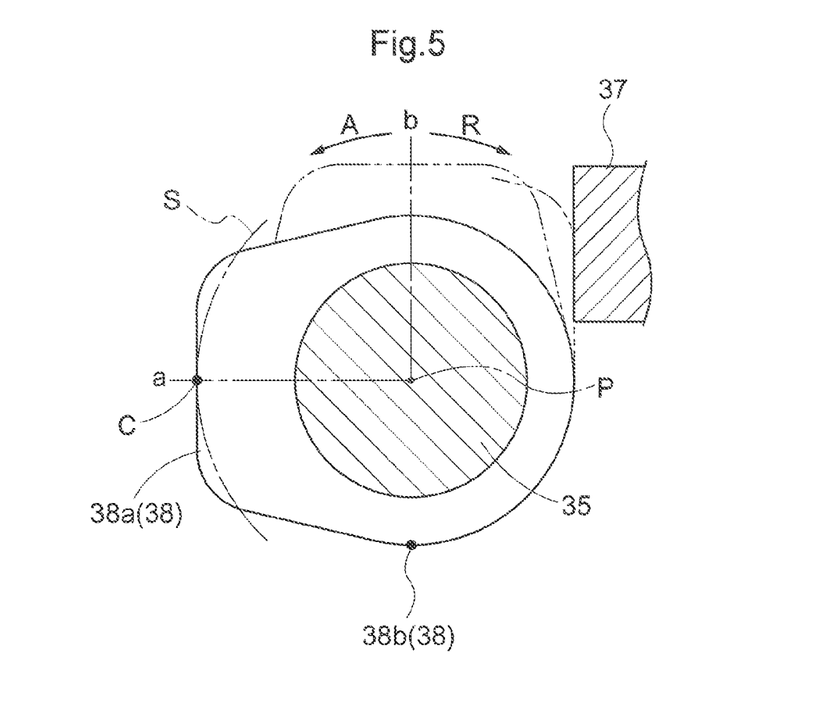
FIG. 5 is a plan view showing the rotary cam.

As shown in FIG. 2, the rotary cam 31 is provided on the side opposite to the side of the stator member 25, relative to the releasing plate 32. As shown in FIG. 5, to the rotational center of the rotary cam 31, one terminal end of an operational shaft 35 is non-rotatably connected. The rotary cam 31, as shown in FIG. 2, is rotatably supported via the operational shaft 35 to the boss portion 21a of the brake case 21. The operational shaft 35 extends in the direction intersecting the axis of the output shaft 6a.

The operational tool 33, as shown in FIG. 2, is provided non-rotatably, in the operational tool 35, at a portion thereof located outside the brake case 21. The operational tool 33 is supported to the brake case 21 to be pivotally operable with the axis P of the operational shaft 35 acting as the pivot. When the operational tool 33 is pivotally operated, the operational shaft 35 is rotated and the rotary cam 31 is rotatably operated by the operational tool 35 about the axis P of the operational shaft 35 acting as the pivot. In this embodiment, the operational tool 33 is constituted of a pivot lever. However, being not limited thereto, as the operational tool 33, it is possible to employ a rotary operational type operational tool such as a wheel.

The operational tool 33, is configured to be pivotally operated by a manual operation to/between a releasing operational position X shown in FIG. 4 and a braking operational position Y shown in FIG. 3. In the instant embodiment, a pivotal range between the releasing operational position X and the braking operational position Y of the operational tool 33 is set to a pivotal range of 90 degrees. This pivotal range between the releasing operational position X and the braking operational position Y of the operational tool 33 may be set also to a pivotal range less than 90 degrees or a pivotal range exceeding 90 degrees.

When the operational tool 33 is operated to the braking operational position Y, the rotary cam 31 is rotated to a releasing position (b) as shown in FIG. 3, thus allowing an operation by the springs 27 of operating the electromagnetic brake 20 to a braking state and also allowing an operation by the electromagnet 22 of operating the electromagnetic brake 20 to a brake releasing state. When the operational tool 33 is operated to the releasing operational position X, the rotary cam 31 is rotated to an acting position (a) as shown in FIG. 4, whereby the rotary cam 31 operates the electromagnetic brake 20 to the brake releasing state against the springs 27.

More particularly, as shown in FIG. 3 and FIG. 4, the rotary cam 31 includes a circumferential cam 38 configured to act on the rotor 24 by operating the releasing plate 32 in correspondence with a lateral face of the releasing plate 32. When the rotary cam 31 is rotatably operated to the releasing position (b), in the circumferential cam 38, a releasing portion 38b thereof corresponding to the releasing position (b) of the rotary cam 31 will come into correspondence with the releasing plate 32. When the rotary cam 31 is rotatably operated to the acting position (a), in the circumferential cam 38, an acting portion 38a thereof corresponding to the acting position (a) of the rotary cam 31 will come into correspondence with the releasing plate 32.

As shown in FIG. 3, when the releasing portion 38b comes into correspondence with the lateral face of the releasing plate 32, due to setting of a distance from the axis P as the rotational center of the rotary cam 31 to the releasing position 38b, the releasing portion 38b releases the pressing action on the releasing plate 32, thus allowing the rotor 24 to be pressed against the stator member 25 by the respective springs 27, and also the releasing portion 38b allows the rotor 24 to be operated into the brake releasing state by the electromagnet 22.

As shown in FIG. 4, when the acting portion 38a comes into correspondence with the lateral face of the releasing plate 32, due to the setting of the distance from the axis P as the rotational center of the rotary cam 31 to the acting position 38a, the acting portion 38a presses the releasing plate 32 toward the electromagnet 22 against the respective springs 27 and slidably operates the rotor 24 via the coupling member 14 toward the electromagnet 22, thus operating the rotor 24 into the brake releasing state against the springs 27. The acting portion 38a is formed linear as shown in FIG. 5. The linear shape of the acting portion 38a is a linear shape along a tangent at the center C of the acting portion 38a with respect to the rotational direction of the rotary cam. More particularly, the tangent of the acting portion 38a at the center C in the rotational direction of the rotary cam is a tangent which is tangential to a circle S extending through the center C in the rotary cam rotational direction of the acting portion 38a centering about the axis P as the rotation center of the rotary cam 31, at an intersection point between this circle S and the center C.

As the rotational direction for rotating the rotary cam 31 from the releasing position (b) to the acting position (a), a set rotational direction A denoted with an arrow in FIG. 5 is set. As shown in FIG. 2, inside the brake case 21, at a portion thereof opposed to the rotary cam 31, there is provided a rotation restriction portion 37 configured to restrict rotation of the rotary cam 31. If an attempt is made to rotate the rotary cam 31 from the releasing position (b) in a rotational direction R opposite to the set rotational direction A (see FIG. 5), when the rotary cam 31 is rotated from the releasing position (b) by a set angle in the opposite direction R, the rotation restriction portion 37 comes into abutment against the circumferential portion of the rotary cam 31, whereby further rotation of the rotary cam 31 in the opposite direction R by an amount exceeding the set angle is restricted by the rotation restriction portion 37. In this embodiment, an angle of 30 degrees is set as the above-described set angle.

In the releasing mechanism 30, even when the electromagnet 22 is under the non-excited state, as shown in FIG. 4, if the operational tool 33 is operated to the releasing operational position X, the rotary cam 31 is rotated to the acting position (a), so that the acting portion 38a comes into contact with the releasing plate 32. As the acting portion 38a and the releasing plate 32 come into contact via the linear shape of the acting portion 38a, the rotary cam 31 can effectively resist displacement from the acting position (a) even if an external force due to e.g. vibration is applied thereto. Upon establishment of the contact between the acting portion 38a and the releasing plate 32, the releasing plate 32 will be pushed toward the electromagnet 22 by the acting portion 38a of the rotary cam 31 and the coupling member 14 will be pushed toward the electromagnet 22 by the pressing operational portion 32b of the boss portion 32a, whereby the pressing of the rotor 24 to the stator member 25 by the respective springs 27 will be released. Namely, the rotor 24 will be operated to the brake releasing state against the respective springs 27 by the acting portion 38a of the rotary cam 31. Supposing the length from the rotational center of the rotary cam 31 to the acting portion 38a and the lever length of the operational tool 33 have a ratio therebetween of 1:10, the electromagnetic brake 20 can be switched over to the brake releasing state by application to the center of the operational tool 33 of an operational force which is ⅕ of the operational force needed to be applied to the releasing plate 32 in order to operate the electromagnetic brake 20 to the brake releasing state.

In the releasing mechanism 30, as shown in FIG. 3, if the operational tool 33 is operated to the braking operational position Y, the rotary cam 31 is rotated to the releasing position (b) to bring the releasing portion 38b into correspondence with the releasing plate 32. In the case of establishment of this correspondence between the releasing portion 38b and the releasing plate 32, if the armature 23 is pressed toward the stator member 25 by the respective springs 27, the rotor 24 will be pressed against the stator member 25 by the armature 23. Namely, the above makes it possible for the rotor 24 to be operated to the braking state by the springs 27 and also makes it possible for the rotor 24 to be operated to the brake releasing state by the excited electromagnet 22.

[Arrangement of Positioning Mechanism]

The operational tool 33, when operated to the braking operational position Y or the releasing operational position X, is positioned, i.e. fixed in position, at such respective operational position by a positioning mechanism 40.

More particularly, the positioning mechanism 40, as shown in FIG. 2, includes an engaging portion 41 protruding downwards from the base portion of the operational tool 33, a positioning portion 42 provided in the outer circumference of the brake case 21 at a portion thereof opposed to the base portion of the operational tool 33, and a spring 43 fitted on the operational shaft 35. The spring 43 is disposed between a spring receiving portion 35a formed in the operational shaft 35 and the boss portion 21a of the brake case 21.

Figure 6:
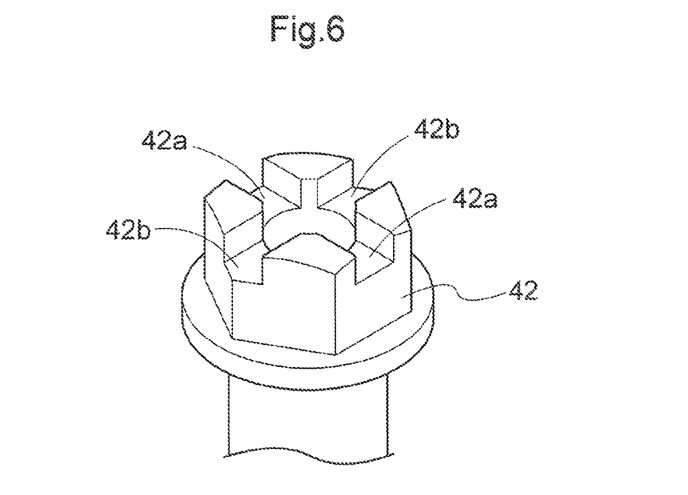
FIG. 6 is a perspective view showing a positioning portion.

The operational shaft 35 is slidably supported to the boss portion 21a and slidably urged toward the inner side of the brake case 21 by the spring 43. In the positioning portion 42, as shown in FIG. 6, there are formed first receded portions 42a for positioning the operational tool 33 at the releasing operational position X and second receded portion 42b for positioning the operational tool 33 at the braking operational position Y.

In the positioning mechanism 40, when the operational tool 33 is slid toward the positioning portion 42 in response to a sliding operation of the operational shaft 35 by the spring 43 thus engaging the engaging portion 41 within the first receded portions 42a, the base portion of the operational tool 33 is retained to the positioning portion 42, thus fixedly positioning the operational tool 33 by the positioning portion 42 at the releasing operational position X. This is a first acting state.

In the positioning mechanism 40, when the operational tool 33 is slid toward the positioning portion 42 in response to a sliding operation of the operational shaft 35 by the spring 43 thus engaging the engaging portion 41 within the second receded portions 42b, the base portion of the operational tool 33 is retained to the positioning portion 42, thus fixedly positioning the operational tool 33 by the positioning portion 42 at the braking operational position Y. This is a second acting state.

In the positioning mechanism 40, when the operational tool 33 is slid toward the outer side of the brake case 21 against the spring 43 thereby to withdraw the engaging portion 41 from the first receded portions 42a and the second receded portions 42b, the retention of the base portion of the operational tool 33 by the positioning portion 42 is released, thus allowing a pivotal movement of the operational tool 33. This is a releasing state.

Normally, the operational tool 33 will be set to the braking operational position Y. With this, the rotary cam 31 is operated to the releasing position (b) by the operational shaft 35. In the course of this, in response to the sliding operation of the operational shaft 35 by the spring 43, the positioning mechanism 40 is set to the second acting state with engagement of the engaging portion 41 in the second receded portions 42b and the operational tool 33 is fixedly positioned at the braking operational position Y by the positioning mechanism 40, thus maintaining the rotary cam 31 at the releasing position (b). Moreover, displacement of the operational tool 33 due to an external force, e.g. vibration, from the braking operational position Y is prevented by the positioning mechanism 40 and displacement of the rotary cam 31 from the releasing position (b) is prevented. When the rotary cam 31 is set at the releasing position (b), if the electromagnet 22 is operated into the non-excited state, the rotor 24 will be operated into the braking state by the springs 27, thus rendering the electromagnetic brake 20 into the braking state, thereby applying braking to the traveling motor 6 and the rear wheels 2. When the electromagnet 22 is operated into the excited state, the rotor 24 will be operated into the brake releasing state by the electromagnet 22 against the springs 27, whereby the electromagnetic brake 20 is rendered into the brake releasing state, thus releasing braking of the traveling motor 6 and the rear wheels 2.

In the situation of braking being applied to the traveling motor 6 and the rear wheels 2, the braking can be manually released by following operations.

Namely, the operational tool 33 located at the braking operational position Y is slidably operated toward the outer side of the brake case 21 against the spring 43, thus removing the engaging portion 41 from the second receded portions 42b. With removal of the engaging portion 41 from the second receded portions 42b, the positioning mechanism 40 is rendered into the releasing state. Then, the operational tool 33 will be pivotally operated from the braking operational position Y in a pivotal direction A1 denoted with the arrow in FIG. 4 into the releasing operational position X. In the instant embodiment, by pivotally operating the operational tool 33 from the braking operational position Y in the pivotal direction A1 by a pivotal stroke of 90 degrees, the operational tool 33 is set to the releasing operational position X. After the operational tool 33 is set to the releasing operational position X, the rotary cam 31 will be rotatably operated in the set rotational direction A from the releasing position (b) to the acting position (a). When the rotary cam 31 is set to the acting position (a), the linear acting portion 38a of the rotary cam 31 presses the releasing plate 32, and a change occurring in the operation reaction force before/after establishment of the acting state of the acting portion 38a will be transmitted to the operational tool 33, so that the arrival of the rotary cam 31 at the acting position (a) can be confirmed through the above change in the operation reaction force. When the operational tool 33 is set to the releasing operational position X, in response to a sliding operation of the operational shaft 35 by the spring 43, the engaging portion 41 will be engaged within the first receded portions 42a, thus rending the positioning mechanism 40 into the first acting state, and the operational tool 33 will be fixedly positioned at the releasing operational position X by the positioning mechanism 40. With arrival of the rotary cam 31 at the acting position (a), due to the line contact of the acting portion 38a relative to the releasing plate 32 and due also to positioning of the operational tool 33 by the positioning mechanism 40, the rotary cam 31 will be firmly and reliably maintained at this acting position (a). With arrival of the rotary cam 31 at the acting position (a), the rotor 24 will be slidably operated toward the electromagnet 22 via the releasing plate 32 by the acting portion 38a of the rotary cam 31; namely, the rotor 24 will be operated to the brake releasing state by the rotary cam 31 against the springs 27, whereby the electromagnetic brake 20 will be rendered into the brake releasing state, thus releasing braking of the traveling motor 6 and the rear wheels 2. Under this condition, by operating the operational tool 33 from the releasing operational position X back to the braking operational position Y, the electromagnet 22 is operated to the non-excited state, whereby the rotor 24 will be operated to the braking state by the springs 27, thus switching the electromagnetic brake 20 to the braking state and also the electromagnet 22 will be operated to the excited state, whereby the rotor 24 will be operated by the electromagnet 22 to the brake releasing state and the electromagnetic brake 20 will be switched over to the brake releasing state.

Further Embodiments (1) In the foregoing embodiment, there was shown a case in which the operational tool 33 is constituted of a pivotal lever. Instead, the operational tool 33 can be constituted of a wheel type rotary operational tool.

(2) In the foregoing embodiment, the non-excitation operable electromagnetic brake 20 configured to act on the traveling electric motor 6 was shown as a specific example. Alternatively, it may be a non-excitation operable electromagnetic brake configured to act on the utility (implement) electric motor 8.

INDUSTRIAL APPLICABILITY

The present invention is applicable to a non-excitation operable electromagnetic brake to be mounted not only on the riding lawnmower, but also on various kinds of work vehicles or machines such as a tractor, a transporter vehicle, etc. The invention is applicable also to a non-excitation operable electromagnetic brake configured to act on various kinds of rotary bodies other than an electric motor.

DESCRIPTION OF SIGNS

22: electromagnet
24: rotor
27: spring
31: rotary cam
33: operational tool
37: rotation restriction portion
38: circumferential cam
38a: acting portion
40: positioning mechanism
41: engaging portion
42: positioning portion
42a: first receded portion
42b: second receded portion
43: urging portion (spring)
a: acting position
b: releasing position

The invention claimed is:

1. A non-excitation operable electromagnetic brake comprising:
   a spring for operating a rotor into a braking state;
   an electromagnet configured, under an excited state thereof, to operate the rotor into a brake releasing state against the spring; and
   a rotary cam manually and rotationally operable between an acting position and a releasing position, wherein in the acting position, the rotary cam is configured to slidably operate the rotor into the brake releasing state against the spring under the non-excited state of the electromagnet and wherein in the releasing position, the rotary cam is configured to release a slidable operation of the rotor into the brake releasing state so that the rotor is operated into the braking state by the spring to allow an operation of the rotor into both the braking state by the spring and the brake releasing state by the electromagnet under the excited state;

wherein in a circumferential cam of the rotary cam, an acting portion thereof corresponding to the acting position is formed linear along a tangent at a center of the acting portion with respect to a rotary cam rotational direction, wherein the non-excitation operable electromagnetic brake further comprises a rotation restriction portion configured to restrict rotation of the rotary cam from the releasing position in a rotational direction opposite to a set rotational direction which is set for switching the rotary cam from the releasing position to the acting position.

2. The non-excitation operable electromagnetic brake of claim 1, wherein the rotation restriction portion is configured to come into contact with the rotary cam.

3. The non-excitation operable electromagnetic brake of claim 1, further comprising a positioning mechanism capable of switchover between a positioning state for fixedly positioning an operational tool for rotating the rotary cam to operational positions corresponding respectively to the releasing position and the acting position and a position releasing state for allowing an operation of the operational tool.

4. The non-excitation operable electromagnetic brake of claim 3, wherein:
   the positioning mechanism includes an engaging portion protruding from the operational tool and a positioning portion provided at a portion opposed to the engaging portion;
   the positioning portion includes a first receded portion for positioning the operational tool at the acting position and a second receded portion for positioning the operational tool at the releasing position; and
   positioning of the operational tool is provided by engagement of the engaging portion in the first receded portion or the second receded portion.

5. The non-excitation operable electromagnetic brake of claim 3, wherein the positioning mechanism further includes an urging portion for urging to maintain the positioned state, wherein a change of the positioning mechanism from the positioning state to the position releasing state is made against an urging force of the urging portion.

* * * * *

UNITED STATES PATENT AND TRADEMARK OFFICE
CERTIFICATE OF CORRECTION

| | |
|---|---|
| PATENT NO. | : 11,247,652 B2 |
| APPLICATION NO. | : 16/434369 |
| DATED | : February 15, 2022 |
| INVENTOR(S) | : Matsuda et al. |

It is certified that error appears in the above-identified patent and that said Letters Patent is hereby corrected as shown below:

In the Claims

Column 11, Line 2, Claim 1, delete "electromagnet" and insert -- electromagnet, --

Column 11, Line 13, Claim 1, delete "direction," and insert -- direction, and --

Signed and Sealed this
Tenth Day of May, 2022

Katherine Kelly Vidal
*Director of the United States Patent and Trademark Office*